(12) United States Patent
Tanaka et al.

(10) Patent No.: US 9,738,802 B2
(45) Date of Patent: *Aug. 22, 2017

(54) WATER-BASED INK FOR INK-JET RECORDING, INK CARTRIDGE, AND INK-JET RECORDING METHOD

(71) Applicant: Brother Kogyo Kabushiki Kaisha, Nagoya-shi, Aichi-ken (JP)

(72) Inventors: Hiroyuki Tanaka, Inazawa (JP); Mitsunori Maeda, Nagoya (JP); Yuki Okumura, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,539

(22) Filed: Aug. 18, 2016

(65) Prior Publication Data

US 2017/0088727 A1 Mar. 30, 2017

(30) Foreign Application Priority Data

Sep. 30, 2015 (JP) ................................. 2015-195500

(51) Int. Cl.
| | | |
|---|---|---|
| C08F 287/00 | (2006.01) | |
| C09D 11/107 | (2014.01) | |
| B41J 2/01 | (2006.01) | |
| C08F 293/00 | (2006.01) | |
| C09D 11/03 | (2014.01) | |

(Continued)

(52) U.S. Cl.
CPC .............. *C09D 11/107* (2013.01); *B41J 2/01* (2013.01); *C08F 293/005* (2013.01); *C09D 11/03* (2013.01); *C09D 11/033* (2013.01); *C09D 11/322* (2013.01); *C08F 212/06* (2013.01); *C08F 220/06* (2013.01); *C08F 220/10* (2013.01); *C08F 257/00* (2013.01);

(Continued)

(58) Field of Classification Search
CPC .......................... C08F 297/026; C08F 293/005
See application file for complete search history.

(56) References Cited

U.S. PATENT DOCUMENTS

| 4,508,880 A | 4/1985 | Webster |
|---|---|---|
| 5,085,698 A | 2/1992 | Ma et al. |

(Continued)

FOREIGN PATENT DOCUMENTS

| EP | 851012 A2 | 7/1998 |
|---|---|---|
| EP | 2330154 A1 | 6/2011 |

(Continued)

OTHER PUBLICATIONS

Mar. 2, 2017—(EP) Extended Search Report—App 16184818.9.

*Primary Examiner* — Richard A Huhn
(74) *Attorney, Agent, or Firm* — Banner & Witcoff, Ltd.

(57) ABSTRACT

A water-based ink for ink-jet recording includes: a pigment; water; a first resin containing at least one of methacrylic acid and acrylic acid as a monomer; and a second resin, wherein the second resin is an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; which has an acid value of 90 mgKOH/g to 200 mgKOH/g; and which is partially or completely neutralized.

15 Claims, 2 Drawing Sheets

(51) Int. Cl.
*C09D 11/033* (2014.01)
*C09D 11/322* (2014.01)
*C08F 212/06* (2006.01)
*C08F 257/00* (2006.01)
*C08F 220/06* (2006.01)
*C08F 265/02* (2006.01)
*C08F 220/10* (2006.01)
*C08F 265/06* (2006.01)

(52) U.S. Cl.
CPC .......... *C08F 265/02* (2013.01); *C08F 265/06* (2013.01); *C08F 287/00* (2013.01)

(56) References Cited

U.S. PATENT DOCUMENTS

| | | | |
|---|---|---|---|
| 5,221,334 A | 6/1993 | Ma et al. | |
| 5,272,201 A | 12/1993 | Ma et al. | |
| 8,016,404 B2 | 9/2011 | Kato et al. | |
| 9,120,948 B2 | 9/2015 | Shimanaka et al. | |
| 2003/0195274 A1* | 10/2003 | Nakamura | B01J 13/04 523/160 |
| 2008/0241398 A1 | 10/2008 | Kato et al. | |
| 2009/0220748 A1 | 9/2009 | Kanaya et al. | |
| 2010/0143590 A1* | 6/2010 | Held | C08F 293/005 427/256 |
| 2011/0223529 A1 | 9/2011 | Shimanaka et al. | |
| 2012/0075381 A1 | 3/2012 | Wachi | |
| 2013/0196064 A1 | 8/2013 | Shimanaka et al. | |
| 2013/0235117 A1 | 9/2013 | Kanaya et al. | |

FOREIGN PATENT DOCUMENTS

| | | |
|---|---|---|
| EP | 2423272 A2 | 2/2012 |
| JP | H05-179183 A | 7/1993 |
| JP | 2006-273892 A | 10/2006 |
| JP | 2008-246821 A | 10/2008 |
| JP | 2014070184 A | 4/2014 |
| WO | 2010-013651 A1 | 2/2010 |

* cited by examiner

WATER-BASED INK FOR INK-JET RECORDING, INK CARTRIDGE, AND INK-JET RECORDING METHOD

CROSS REFERENCE TO RELATED APPLICATION

The present application claims priority from Japanese Patent Application No. 2015-195500 filed on Sep. 30, 2015, the disclosure of which is incorporated herein by reference in its entirety.

BACKGROUND OF THE INVENTION

Field of the Invention

The present invention relates to a water-based ink for ink-jet recording, an ink cartridge, and an ink-jet recording method.

Description of the Related Art

Ink-jet recording is conventionally performed by using water-based pigment inks for ink-jet recording in which pigments are used as colorant. The typical water-based pigment inks suffer from the problem of rubbing resistance in which a part of the pigment jetted on a recording medium remains on a surface of the recording medium and the remaining pigment peels off from the recording medium when being rubbed by a finger or the like. In order to solve the problem, Japanese Patent Application laid-open No. 2006-273892 corresponding to United States Patent Application Publication Nos. 2009/0220748 and 2013/0235117 discloses an approach in which a polymer is added to the water-based pigment ink to improve the rubbing resistance on the recording medium.

However, adding the polymer to the water-based pigment ink in an excessive amount for the purpose of improving the rubbing resistance may cause the following problem. Namely, when moisture or water in the water-based pigment ink evaporates, the polymer increases the viscosity of the water-based pigment ink to affect maintenance performance. Further, recent ink-jet recording using the water-based ink for ink-jet recording needs higher quality images and higher speed operation. Thus, a water-based pigment ink for ink-jet recording which has a better rubbing resistance in recording on glossy paper is required.

In view of the above, an object of the present teaching is to provide a water-based pigment ink for ink-jet recording which has a good rubbing resistance in recording on glossy paper and is less likely to increase the viscosity after evaporation.

SUMMARY OF THE INVENTION

According to a first aspect of the present teaching, there is provided a water-based ink for ink-jet recording, including: a pigment; water; a first resin containing at least one of methacrylic acid and acrylic acid as a monomer; and a second resin, wherein the second resin is an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; which has an acid value of 90 mgKOH/g to 200 mgKOH/g; and which is partially or completely neutralized.

According to a second aspect of the present teaching, there is provided an ink cartridge which includes the water-based ink for ink-jet recording as defined in the first aspect.

According to a third aspect of the present teaching, there is provided an ink-jet recording method including discharging the water-based ink for ink-jet recording as defined in the first aspect on glossy paper in accordance with an ink-jet system to perform recording.

DESCRIPTION OF THE EMBODIMENTS

Figure 1A:
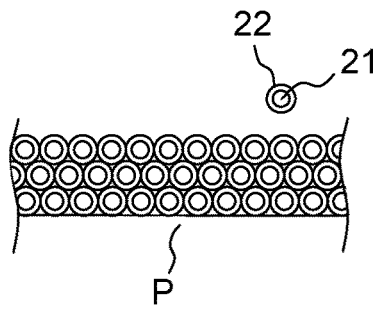
FIGS. 1A to 1C are conceptual views each illustrating an exemplary assumed mechanism about the improvement of rubbing resistance in recording on glossy paper according to the present teaching.

In the present teaching, "glossy paper" means, for example, recording paper in which at least not less than one coating layer(s) is/are formed on its recording surface. The coating layer(s) is/are made of silica particles, alumina particles, or the like. Examples of the glossy paper include photo glossy paper "BP61G" "BP71G" and "BP71GA4" manufactured by BROTHER KOGYO KABUSHIKI KAISHA; ink-jet paper "Kassai" Photo-finish Pro manufactured by FUJI FILM CORPORATION; and highest grade glossy paper "PWRA4-20" manufactured by KODAK JAPAN LTD.

An explanation will be made about a water-based ink for ink-jet recording of the present teaching (hereinafter also referred to as "water-based ink" or "ink" in some cases). The water-based ink for ink-jet recording of the present teaching contains a pigment, water, a first resin, and a second resin.

The pigment is not particularly limited and includes, for example, carbon black, inorganic pigment, and organic pigment. The carbon black includes, for example, furnace black, lamp black, acetylene black, and channel black. The inorganic pigment includes, for example, titanium oxide, iron oxide-based inorganic pigment, and carbon black-based inorganic pigment. The organic pigment includes, for example, azo-pigments such as azo lake, insoluble azo-pigment, condensed azo-pigment, and chelate azo-pigment; polycyclic pigments such as phthalocyanine pigment, perylene and perynon pigments, anthraquinone pigment, quinacridone pigment, dioxadine pigment, thioindigo pigment, isoindolinone pigment, and quinophthalone pigment; dye lake pigments such as basic dye type lake pigment and acid dye type lake pigment; nitro pigments; nitroso pigments; and aniline black daylight fluorescent pigment. Other pigments are also usable provided that the pigments are dispersible in the water phase. The pigments are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; and solid solutions of the above-listed pigments.

The pigment may be a black pigment or a color pigment, namely, a chromatic color pigment. Further, the pigment may be a self-dispersible pigment or a resin-dispersible pigment. The self-dispersible pigment is dispersible in water, for example, owing to the fact that at least one of the hydrophilic functional group and the salt thereof including, for example, a carbonyl group, a hydroxyl group, a sulfonic acid group (sulfonate group), a carboxylic acid group, and a phosphoric acid group (phosphate group) is introduced into the surfaces of the pigment particles by the chemical bond directly or with any group intervening therebetween. The resin-dispersible pigment is dispersible in water by use of a resin dispersant, such as a water-soluble resin and/or a water-dispersible resin. In the present teaching, the "resin-dispersible pigment" does not include the self-dispersible pigment.

The solid content blending amount of the pigment (pigment solid content amount) in the entire amount of the water-based ink is not particularly limited, and may be appropriately determined based on desired optical density, color (hue, tint), or the like. The pigment solid content amount is, for example, in a range of 0.1% by weight to 20% by weight, 1% by weight to 15% by weight, or 2% by weight to 10% by weight.

The water is preferably ion-exchanged water or pure water (purified water). The blending amount of the water in the entire amount of the water-based ink (the proportion of the water in the water-based ink) is, for example, in a range of 10% by weight to 90% by weight, and preferably in a range of 40% by weight to 80% by weight. The proportion of the water in the water-based ink may be, for example, a balance of the other components.

The water-based ink may or may not contain another colorant such as a dye, in addition to the pigment.

The first resin has, for example, a function by which the pigment is dispersed in water. Any resin may be used as the first resin, provided that the resin contains, as a monomer, at least one of methacrylic acid and acrylic acid (hereinafter referred to as "(metha) acrylic acid" in some cases). For example, any commercially available product may be used for the first resin. The first resin may further contain, as monomers, styrene, vinyl chrroride, and/or the like. The first resin may be prepared by neutralizing a part or all of the methacrylic acid and/or acrylic acid. Those usable as the first resin include, for example, a styrene-acrylic acid copolymer, a styrene-methacrylic acid copolymer, and the salt thereof. It is possible to use, for example, sodium hydroxide as a neutralizer. The first resin may be a sodium hydroxide neutralized product of the styrene-acrylic acid copolymer or a sodium hydroxide neutralized product of the styrene-methacrylic acid copolymer. Examples of the commercially available product include "JOHNCRYL (trade name) 611" (weight average molecular weight: 8,100, acid value: 53 mgKOH/g), "JOHNCRYL (trade name) 60" (weight average molecular weight: 8,500, acid value: 215 mgKOH/g), "JOHNCRYL (trade name) 586", "JOHNCRYL (trade name) 687", "JOHNCRYL (trade name) 63", and "JOHNCRYL (trade name) HPD296" produced by BASF Corporation; "Disperbyk 190" and "Disperbyk 191" produced by BYK additives & Instruments; and "SOLSPERSE 20000" and "SOLSPERSE 27000" produced by Zeneca. As the first resin, only one kind of the resin as described above may be used singly, or two or more kinds of mixed resins may be used.

The second resin is prepared by neutralizing a part or all of an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; and which has an acid value of 90 mgKOH/g to 200 mgKOH/g.

The water-based ink containing the first and second resins has a good rubbing resistance in recording on glossy paper. The mechanism improving the rubbing resistance is assumed, for example, as follows. Conventional water-based pigment inks use two resins together. The two resins are a resin by which the pigment is dispersed and a resin by which the rubbing resistance is improved. The water-based ink of the present teaching uses the second resin as the resin by which the rubbing resistance is improved, which results in a better rubbing resistance in recording on glossy paper and prevents the increase in viscosity after evaporation.

The rubbing resistance in recording on glossy paper is obtained by getting resins entangled to form a film. When the pigment of the water-based pigment ink is dispersed by use of the first resin, a (metha) acrylic acid residue is exposed on the surfaces of pigment particles in a dispersed state. Thus, using the second resin is effective to improve the rubbing resistance because the second resin contains, as the monomer, the methacrylic acid having a common residue with the first resin and the second resin has the strong affinity for the first resin. Especially, the polymer block A of the second resin has the strong affinity for the first resin, because it is composed only of methyl methacrylate and methacrylic acid. When a random copolymer or a diblock copolymer is used as the resin by which the rubbing resistance is improved, the polymer chain has no portion having the strong affinity for the first resin, or only one end of the polymer chain is a portion having the strong affinity for the first resin and the other end of the polymer chain is an exposed portion having weak affinity for the first resin. The water-based ink of the present teaching, however, uses the second resin having portions (polymer blocks A) that are arranged at ends of the second resin and have the strong affinity for the first resin, thereby making it possible to strongly connecting or coupling pigment particles adjacent to each other.

The second resin also has the hydrophobic polymer block B. This reduces the total ion concentration in the water-based pigment ink and provides the second resin with a moderate strength. When the total ion concentration in the water-based pigment ink increases, the electrical repulsion between pigment particles decreases. This reduces the stability of pigment dispersion. To solve this problem, making a center part having little contribution to the connection of pigment particles the polymer block B that has a low concentration of ionic monomer can reduce the total ion concentration in the water-based ink. Further, the polymer composed only of the methacrylic acid is inferior in strength. To solve this problem, adding the monomer that shows a good strength after polymerization provides the second resin with strength. Note that, benzyl methacrylate having a low glass-transition temperature (Tg) is selected rather than, for example, styrene having a high Tg to provide the second resin with moderate flexibility and prevent the water-based ink from losing the rubbing resistance in recording on glossy paper.

Figure 1B:
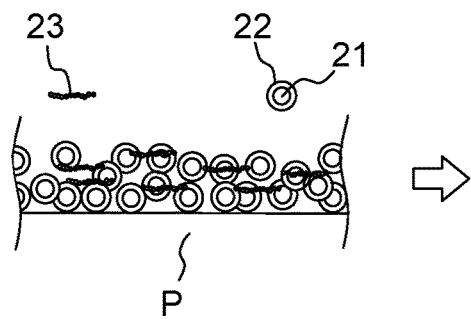
Figure 1C:
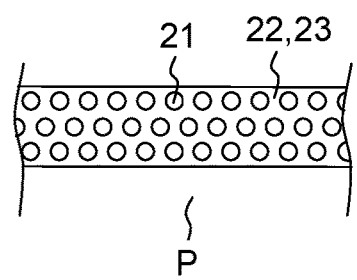

FIGS. 1A to 1C are conceptual diagrams illustrating an exemplary assumed mechanism about the improvement of rubbing resistance in recording on glossy paper by using a resin-dispersible pigment ink that contains the resin by which the pigment is dispersed (hereinafter also referred to as "pigment-dispersing resin"). As depicted in FIG. 1A, when the water-based ink containing pigment particles 21 covered with a pigment-dispersing resin 22 (the first resin) is discharged or jetted onto glossy paper P, the pigment particles 21 covered with the pigment-dispersing resin 22 (the first resin) remain or stay on the surface of the glossy paper P. If the resin-dispersible pigment ink does not contain the second resin of the present teaching, the pigment particles 21 covered with the pigment-dispersing resin 22 (the first resin) and deposited on the glossy paper P can not form a coating film having sufficient strength and the coating film with insufficient strength is easily peeled off by being rubbed softly. On the other hand, as depicted in FIG. 1B, when the resin-dispersible pigment ink contains a resin 23 (the second resin) of the present teaching, the resin 23 (the second resin) enters between the pigment particles 21 covered with the pigment-dispersing resin 22 (the first resin). As a result, as depicted in FIG. 1C, the resin 23 (the second resin) and the pigment-dispersing resin 22 (the first resin) form a coating film to strongly connect the pigment particles 21 to each other. The rubbing resistance of the resin-dispersible pigment ink in recording on glossy paper is improved, accordingly. Note that FIGS. 1A to 1C are conceptual diagrams, and thus the ratio of the pigment particle size to the size of the second resin, the number of monomers in the second resin, and the like differ from actual ones. The same is true on FIGS. 2A and 2B.

Figure 2A:
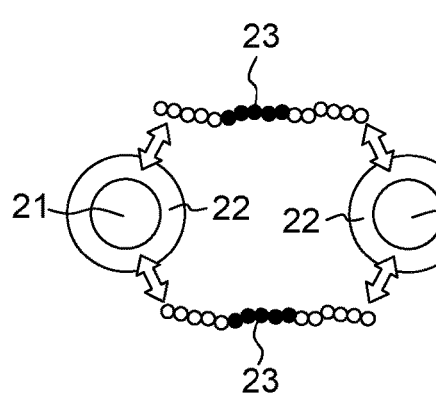
FIGS. 2A and 2B are conceptual views each illustrating an exemplary interaction between a pigment and an ABA-type triblock copolymer according to the present teaching.
Figure 2B:
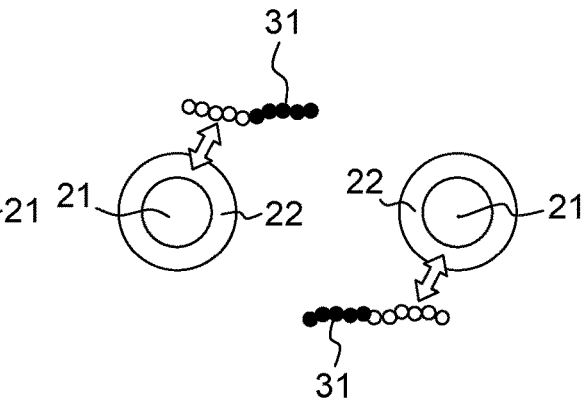

FIGS. 2A and 2B are conceptual diagrams illustrating an exemplary interaction between the pigment and the second resin of the present teaching. As depicted in FIG. 2A, the resin 23 (the second resin) having a structure in which the hydrophobic polymer block B is sandwiched by two hydrophilic polymer blocks A has a larger interaction with the pigment-dispersing resin 22 (the first resin) covering each pigment particle 21 than an AB-type diblock copolymer 31 depicted in FIG. 2B. Thus, it is believed that the connection between pigment particles 21 by using the resin 23 (the second resin) is stronger than the connection between pigment particles 21 by using the AB-type diblock copolymer 31.

All of the assumed mechanisms are just assumptions, and the present teaching is not limited thereto.

The weight average molecular weight of the second resin is in a range of 3,000 to 30,000, for example, 6,500 to 30,000, or 8,000 to 15,000. The second resin has only to have such a configuration that one polymer block B is sandwiched by two polymer blocks A. The ratio of the weight average molecular weight of each polymer block A to the weight average molecular weight of the polymer block B is not particularly limited. The ratio may be, for example, A:B:A=1:1:1, or any other ratio is also allowable. The ratio of the weight average molecular weight of the polymer block A to the weight average molecular weight of the polymer block B is, for example, (AB)=0.2 to 8, preferably 0.5 to 2. Making the weight average molecular weights of the polymer blocks A, B within the above ranges optimizes the solubility of the second resin to water and the strength of the second resin. It is preferred that the two polymer blocks A at both ends of water-soluble resin molecules have substantially the same weight average molecular weight. The weight average molecular weight can be measured, for example, in accordance with JISK0124.

The acid value of the second resin is in a range of 90 mgKOH/g to 200 mgKOH/g, for example, 100 mgKOH/g to 200 mgKOH/g or 100 mgKOH/g to 150 mgKOH/g. The acid value can be measured, for example, in accordance with JISK0070.

Each polymer block A of the ABA-type triblock copolymer is a random copolymer composed only of methyl methacrylate and methacrylic acid. The weight ratio of the methyl methacrylate to the methacrylic acid is, for example, (methyl methacrylate)/(methacrylic acid)=0.2 to 4.5, preferably 1.7 to 3.8. The polymer block B of the ABA-type triblock copolymer is a random copolymer composed only of benzyl methacrylate and methacrylic acid. The weight ratio of the benzyl methacrylate to the methacrylic acid is, for example, (benzyl methacrylate)/(methacrylic acid)=0.8 to 65.0, preferably 3.8 to 32.0. In the ABA-type triblock copolymer, each polymer block A is hydrophilic and the polymer block B is hydrophobic. When the polymer blocks A, B contain monomers so that their weight ratios are within the above ranges, it is possible to obtain the well balance between the hydrophilic property of each polymer block A and the hydrophobic property of the polymer block B.

The second resin is prepared by neutralizing a part or all of the ABA-type triblock copolymer. In particular, a part or all of the methacrylic acid in the ABA-type triblock copolymer is neutralized by a neutralizer which is a base. The neutralization improves the solubility of the second resin. Although the neutralizer is not particularly limited, it is preferred that potassium hydroxide be used in view of solubility of a salt formed with the neutralizer.

The second resin may be prepared, for example, privately or independently, or any commercially available product may be used for the second resin. The second resin may be prepared, for example, by a step-by-step polymerization method. The step-by-step polymerization method is exemplified, for example, by an anion polymerization method or a group transfer polymerization method described in U.S. Pat. No. 4,508,880. In the group transfer polymerization method, an initiator may be non-functional, may contain an acid group, or may contain an amino group. Further, the second resin may be prepared, for example, by an anion polymerization method or a group transfer polymerization method in which one of the two polymer blocks A is polymerized first, the polymer block B is polymerized second, and the other of the two polymer blocks A is polymerized last. A specific example of the preparation method of the second resin will be explained, for example, in EXAMPLES as described later. The above preparation methods, however, are merely examples, and the second resin may be prepared by any other method.

The blending amount of the second resin in the entire amount of the water-based ink is, for example, in a range of 0.1% by weight to 5% by weight, 0.25% by weight to 2.5% by weight, or 0.5% by weight to 2% by weight. The second resin even in a small amount can improve the rubbing resistance in recording on glossy paper, thereby preventing the increase in viscosity after evaporation.

The total blending amount of the first resin and the second resin in the water-based ink is, for example, 10% by weight or less, 6% by weight or less, or 4% by weight or less. Making the total blending amount of the first resin and the second resin within the above ranges results in the water-based ink for ink-jet recording of the present teaching in which the increase in viscosity after evaporation is further prevented. In view of further improving the rubbing resistance in recording on glossy paper, the total blending amount of the first resin and the second resin in the water-based ink is preferably 1.0% by weight or more, more preferably 1.3% by weight or more.

The weight ratio between the first resin (R) and the second resin (C) in the water-based ink, namely, the weight ratio of the blending amount of the second resin to the blending amount of the first resin in the water-based ink is, for example, C/R=0.05 to 2, 0.1 to 1.5, or 0.2 to 1. Making the weight ratio (C/R) within the above ranges results in the water-based ink for ink-jet recording of the present teaching which has a better rubbing resistance in recording on glossy paper and is less likely to increase the viscosity after evaporation.

In the water-based ink, the weight ratio ((R+C)/P) of the total blending amount (R+C) of the first resin and the second resin in the water-based ink to the blending amount (P) of the pigment in the water-based ink is, for example, 0.14 to 3.3, preferably 0.18 to 2.0, and more preferably 0.26 to 1.4. Making the weight ratio ((R+C)/P) within the above ranges results in the water-based ink for ink-jet recording of the present teaching which has a better rubbing resistance in recording on glossy paper and is less likely to increase the viscosity after evaporation.

The water-based ink may further contain a water-soluble organic solvent. The water-soluble organic solvent is exemplified, for example, by a humectant which prevents the water-based ink from drying at an end of a nozzle in an ink-jet head and a penetrant which adjusts the drying velocity on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above-described humectants, the use of polyvalent alcohols such as alkylene glycol and glycerol is preferred, and the use of glycerol is more preferred.

The blending amount of the humectant in the entire amount of the water-based ink is, for example, in a range of 0% by weight to 95% by weight, 5% by weight to 80% by weight, or 5% by weight to 50% by weight.

The penetrant includes, for example, glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Among the above penetrants, the use of triethylene glycol-n-butyl ether is preferred. One kind of the penetrant may be used singly, or two or more kinds of the penetrants may be used in combination.

The blending amount of the penetrant in the entire amount of the water-based ink is, for example, in a range of 0% by weight to 20% by weight, 0% by weight to 15% by weight, or 1% by weight to 4% by weight.

The water-based ink may contain glycerol as the humectant and triethylene glycol-n-butyl ether as the penetrant. The glycerol and triethylene glycol-n-butyl ether in the water-based ink of the present teaching exert great effects as the humectant and the penetrant, respectively.

The water-based ink may further contain a conventionally known additive, as necessary. Examples of the additive include, surfactants, pH-adjusting agents, viscosity-adjusting agents, surface tension-adjusting agents, and fungicides. The viscosity-adjusting agents include, for example, polyvinyl alcohol, cellulose, and water-soluble resin.

The water-based ink can be prepared, for example, such that the pigment, the first resin, the second resin, water, and optionally other additive component(s) are mixed uniformly or homogeneously by any conventionally known method, and undissolved matters are removed by a filter or the like.

The water-based ink for ink-jet recording of the present teaching containing the pigment, the first resin, and the second resin has a good rubbing resistance in recording on glossy paper and is less likely to increase the viscosity after evaporation.

Next, the ink cartridge of the present teaching is characterized by being an ink cartridge containing a water-based ink for ink-jet recording; wherein the water-based ink for ink-jet recording is the water-based ink for ink-jet recording of the present teaching. For example, any conventionally known main body (body) of an ink cartridge can be used for the main body of the ink cartridge of the present teaching.

Next, an explanation will be given about an ink-jet recording apparatus and an ink-jet recording method of the present teaching.

The ink-jet recording apparatus of the present teaching is an ink-jet recording apparatus characterized by including: an ink accommodating section configured to accommodate an ink therein; and an ink discharge mechanism configured to discharge the ink accommodated in the ink accommodating section; wherein the ink accommodated in the ink accommodating section is the water-based ink of the present teaching.

The ink-jet recording method of the present teaching is an ink-jet recording method characterized by including: performing recording on a recording medium by discharging, to the recording medium, a water-based ink by an ink-jet system; and using the water-based ink for ink-jet recording of the present teaching, as the water-based ink. It is preferred that the glossy paper be used as the recording medium. The present teaching, however, is not limited to this. For example, a regular paper or the like may be used.

The ink-jet recording method of the present teaching can be practiced, for example, by using the ink-jet recording apparatus of the present teaching. The recording includes printing a letter (text), printing an image, printing, etc.

Figure 3:
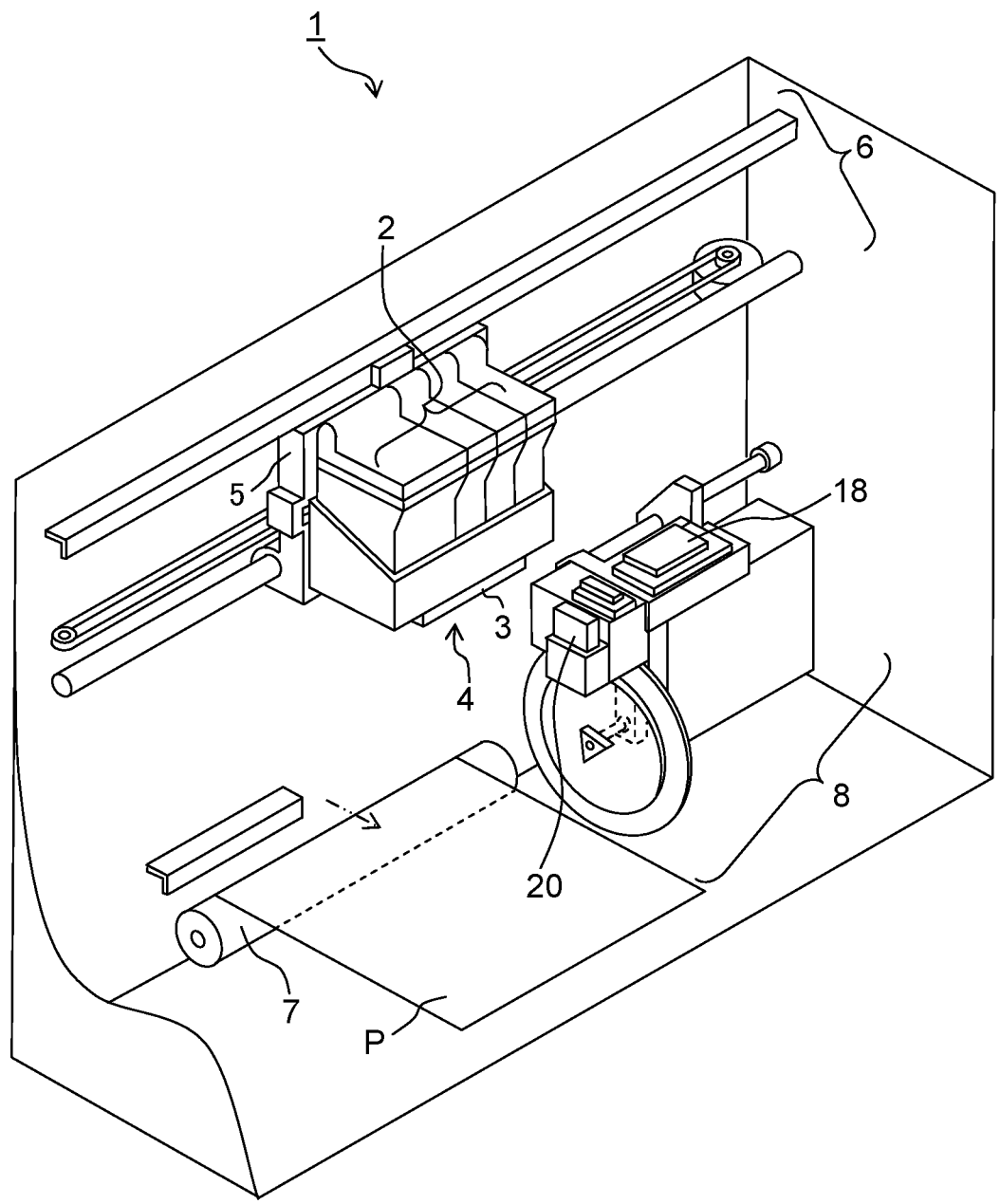
FIG. 3 is a schematic perspective view of an exemplary configuration of an ink-jet recording apparatus of the present teaching.

FIG. 3 depicts an exemplary configuration of the ink-jet recording apparatus of the present teaching. As depicted in FIG. 3, an ink-jet recording apparatus 1 of the present teaching includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. At least one water-based ink among the four color water-based inks is the water-based ink for ink-jet recording of the present teaching. The ink-jet head 3 disposed on the head unit 4 performs recording on a recording medium (for example, glossy paper) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face the ink-jet head 3.

The purge device 8 sucks or draws unsatisfactory ink (poor ink) which contains air bubbles, etc. accumulated or trapped inside the ink-jet head 3. As the purge device 8, it is possible to use, for example, a conventionally known purge device (see, for example, Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 3, a cap 18 is provided to cover a plurality of nozzles of the ink-jet head 3 which is returned to a reset position upon completion of the recording, so as to prevent the water-based inks from drying.

In the ink-jet recording apparatus 1 of this embodiment, the four ink cartridges 2 are provided, together with the head unit 4, on one carriage 5. However, the present teaching is not limited to this. In the ink-jet recording apparatus 1, the respective four cartridges 2 may be provided on a carriage which is different (separate) from the carriage on which the head unit 4 is provided. Alternatively, the respective four cartridges 2 may be arranged and fixed inside the ink-jet recording apparatus 1, rather than being provided on the carriage 5. In such aspects, for example, each of the four cartridges 2 and the head unit 4 which is provided on the carriage 5 are connected with a tube, etc., and the water-based inks are supplied from the four cartridges 2, respectively, to the head unit 4 via the tubes.

Ink-jet recording using the ink-jet recording apparatus 1 is performed, for example, in the following manner. Namely, at first, a recording paper P is supplied or fed from a feed cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. The recording paper P after the recording is discharged from the ink-jet recording apparatus 1. According to the present teaching, a recorded matter having a good rubbing resistance can be obtained in recording on glossy paper. In FIG. 3, illustration of the feed mechanism and discharge mechanism for the recording paper P is omitted.

In the apparatus depicted in FIG. 3, an ink-jet head of serial type (serial type ink-jet head) is adopted. The present teaching, however, is not limited to this. The ink-jet recording apparatus may be an apparatus adopting an ink-jet head of line type (line type ink-jet head).

EXAMPLES

Next, examples of the present teaching will be explained together with comparative examples. Note that the present teaching is not limited and is not restricted to the examples and the comparative examples which will be described below.

[Preparation of Second Resin]

The second resin was synthesized by a living radical polymerization technique. 2-iodo-2-cyanopropane, azobisisobutyronitrile, iodosuccinimide, methyl methacrylate, and methacrylic acid were added to diethylene glycol dimethyl ether under a nitrogen atmosphere, and the temperature of this mixture was raised, thereby promoting and completing the polymerization reaction. Next, a mixture of benzyl methacrylate and methacrylic acid was added and polymerized. After that, a mixture of methyl methacrylate and methacrylic acid was added and polymerized. Accordingly, an ABA-type triblock copolymer was obtained. Further, the aqueous solution of the second resin b1 indicated in TABLES 1 to 3 and in which the weight average molecular weight was 10,000 and the acid value was 130 mgKOH/g was obtained by distilling off diethylene glycol dimethyl ether under reduced pressure and adding purified water and potassium hydroxide. The aqueous solutions of second resins b2 to b8 indicated in TABLE 2 were obtained in a similar manner as the aqueous solution of the second resin b1, except that a polymerization temperature, polymerization solvent, initiator, monomer composition, radical generator, catalyst, neutralizer, and polymerization time were changed appropriately. The monomer weight ratios of the second resins b1 to b8 (methyl methacrylate/methacrylic acid//benzyl methacrylate/methacrylic acid//methyl methacrylate/methacrylic acid) are indicated as follows. Two slashes mean separation between blocks, one slash means a random copolymer.

Second Resin b1
0.25/0.09//0.31/0.03//0.25/0.09
Second Resin b2
0.26/0.07//0.32/0.01//0.26/0.07
Second Resin b3
0.24/0.09//0.30/0.04//0.24/0.09
Second Resin b4
0.21/0.12//0.27/0.07//0.21/0.12
Second Resin b5
0.25/0.09//0.31/0.03//0.25/0.09
Second Resin b6
0.25/0.09//0.31/0.03//0.25/0.09
Second Resin b7
0.25/0.09//0.31/0.03//0.25/0.09
Second Resin b8
0.25/0.09//0.31/0.03//0.25/0.09

[Preparation of Random Copolymer]

The random copolymer was synthesized similarly to the second resin by the living radical technique, except that the methyl methacrylate, methacrylic acid, and benzyl methacrylate were mixed all together. Further, the aqueous solution of the random copolymer which was indicated in TABLE 2 and in which the weight average molecular weight was 10,000 and the acid value was 130 mgKOH/g was obtained by distilling off diethylene glycol dimethyl ether under reduced pressure and adding purified water and potassium hydroxide. The monomer weight ratio of the random copolymer (methyl methacrylate/methacrylic acid/benzyl methacrylate) is indicated as follows. One slash means a random copolymer.

Random Copolymer 0.49/0.17/0.31

[Preparation of Pigment Dispersion Liquids 1, 3, and 4]

Purified water was added to 20% by weight of a pigment (C.I. pigment red 122) and 7% by weight of a sodium hydroxide neutralized product of a styrene-acrylic acid copolymer (acid value 175, molecular weight 10,000) so that the sum of them was 100% by weight, followed by being stirred (agitated) and mixed with each other. This mixture was put in a wet sand mill using zirconia beads with a diameter of 0.3 mm as a medium to perform dispersion treatment for six hours. After that, the zirconia beads were removed by a separator, and the mixture thus obtained was filtrated through a cellulose acetate filter (pore size 3.00 μm). The pigment dispersion liquid 1 was obtained, accordingly. The styrene-acrylic acid copolymer is a water-soluble polymer widely used as the pigment dispersant. The pigment dispersion liquids 3, 4 indicated in TABLE 3 were obtained similarly to the pigment dispersion liquid 1, except that the type of pigment, the ratio of components, and the dispersion treatment time were changed appropriately.

[Preparation of Pigment Dispersion Liquid 2]

Purified water was added to 20% by weight of a pigment (C.I. pigment red 122) and 9% by weight of a sodium hydroxide neutralized product of a styrene-methacrylic acid copolymer (acid value 175, molecular weight 10,000) so that the sum of them was 100% by weight, followed by being stirred (agitated) and mixed with each other. This mixture was put in a wet sand mill using zirconia beads with a diameter of 0.3 mm as a medium to perform dispersion treatment for six hours. After that, the zirconia beads were removed by a separator, and the mixture thus obtained was filtrated through a cellulose acetate filter (pore size 3.00 μm). The pigment dispersion liquid 2 was obtained, accordingly. The styrene-methacrylic acid copolymer is a water-soluble polymer widely used as the pigment dispersant.

Examples 1-1 to 1-7 and Comparative Example 1-1

Examples 1-1 to 1-7 were examples using mutually different weight ratios C/R. Components, except for the pigment dispersion liquid 1 and the second resin b1, which were included in Ink composition (TABLE 1) were mixed uniformly or homogeneously; and thus an ink solvent was obtained. Subsequently, the aqueous solution of the second resin b1 and the ink solvent were added to the pigment dispersion liquid 1, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 1-1 to 1-7 and Comparative Example 1-1 was obtained.

Regarding the water-based inks of Examples 1-1 to 1-7 and Comparative Example 1-1, (a) the evaluation of rubbing resistance in recording on glossy paper and (b) the evaluation of viscosity after evaporation were performed by the following methods.

(a) Evaluation of Rubbing Resistance in Recording on Glossy Paper

A digital multi-function peripheral equipped with an ink-jet printer "MFC-J4510N" manufactured by BROTHER KOGYO KABUSHIKI KAISHA was used to record an image including a single color patch on glossy paper (photo glossy paper "BP71GA4", exclusive or dedicated paper manufactured by BROTHER KOGYO KABUSHIKI KAISHA), with a resolution of 1200 dpi×2400 dpi, by using each of the water-based inks of Examples 1-1 to 1-7 and Comparative Example 1-1. Thus, evaluation samples were produced. Each of the evaluation samples was rubbed with a rubber glove to which a constant load of $8 \times 10^3$ Pa was applied at predetermined time intervals. The rubbing-off on and around the rubbed part was observed visually in accordance with the following evaluation criteria. In the following evaluation criteria, "dirt" means color staining of the water-based ink which is caused by the water-based ink spreading over a non-recorded part of the glossy paper, and "rubbing-off" means a scratch (damage caused by rubbing) caused in a recorded part of the glossy paper.

<Evaluation Criteria for Evaluation of Rubbing Resistance in Recording on Glossy Paper>

AA: When the evaluation sample was rubbed after the elapse of three minutes from its manufacture, no dirt and no rubbing-off were caused on and around the rubbed part.

A: When the evaluation sample was rubbed after the elapse of four minutes from its manufacture, no dirt and no rubbing-off were caused on and around the rubbed part.

B: When the evaluation sample was rubbed after the elapse of five minutes from its manufacture, no dirt and no rubbing-off were caused on and around the rubbed part.

C: When the evaluation sample was rubbed after the elapse of five minutes from its manufacture, dirt and rubbing-off were caused on and around the rubbed part.

(d) Evaluation of Viscosity after Evaporation 5 g of the water-based ink of each of Examples 1-1 to 1-7 and Comparative Example 1-1 was poured into an open bottle (vial) (diameter: 20 mm). Subsequently, the open bottle was stored overnight in an environment at a temperature of 60° C. and a relative humidity of 40%. After the storage, the viscosity of each water-based ink was measured by using a viscometer (model name: "TVE-25" manufactured by TOKI SANGYO CO., LTD.) at a temperature of 25° C. and then it was evaluated in accordance with the following evaluation criteria.

<Evaluation Criteria for Evaluation of Viscosity after Evaporation>

AA: The viscosity was less than 2,000 mPa·s.

A: The viscosity was not less than 2,000 mPa·s.

TABLE 1 shows the ink compositions and the evaluation results for the water-based inks of Examples 1-1 to 1-7 and Comparative Example 1-1.

Table 1 (Following)—Legend

*1: Anionic surfactant; produced by LION SPECIALITY CHEMICALS CO., LTD.

Regarding numerals in TABLE 1, those of the pigment dispersion liquid and copolymers indicate solid content amounts and that of the surfactant indicates the active ingredient.

TABLE 1

| | | | | Examples | | | | | | | Comparative Examples |
|---|---|---|---|---|---|---|---|---|---|---|---|
| | | | | 1-1 | 1-2 | 1-3 | 1-4 | 1-5 | 1-6 | 1-7 | 1-1 |
| Ink Composition (% by weight) | Pigment dispersion liquid 1 | Pigment | C.I. pigment red 122 | 5.00 | 5.00 | 5.00 | 5.00 | 7.00 | 3.00 | 7.00 | 5.00 |
| | | First resin | Styrene-acrylic acid copolymer | 1.75 | 1.75 | 1.75 | 1.75 | 2.45 | 1.05 | 2.45 | 1.75 |
| | | Weight average molecular weight | Acid value mg KHO/g | | | | | | | | |
| | Second resin b1 | 10,000 | 130 | 1.00 | 0.25 | 0.50 | 1.50 | 2.50 | 1.00 | 1.00 | — |
| | SUNNOL (trade name) NL1430 (*1) | | | 3.00 | 3.00 | 3.00 | 3.00 | 3.00 | 3.00 | 3.00 | 3.00 |
| | Triethylene glycol-n-butyl ether | | | 5.00 | 5.00 | 5.00 | 5.00 | 5.00 | 5.00 | 5.00 | 5.00 |
| | 85% Glycerol | | | 20.00 | 20.00 | 20.00 | 20.00 | 20.00 | 20.00 | 20.00 | 20.00 |
| | Water | | | balance | balance | balance | balance | balance | balance | balance | balance |
| Second resin/First resin (C/R) | | | | 0.571 | 0.143 | 0.286 | 0.857 | 1.02 | 0.952 | 0.408 | — |
| First resin + Second resin | | | | 2.75 | 2.00 | 2.25 | 3.25 | 4.95 | 2.00 | 3.45 | 1.75 |
| Rubbing resistance in recording on glossy paper | | | | AA | A | AA | AA | AA | AA | AA | C |
| Viscosity after evaporation | | | | AA | AA | AA | AA | A | AA | AA | AA |

As shown in TABLE 1, Examples 1-1 to 1-7 had good evaluation results of the rubbing resistance in recording on glossy paper and the viscosity after evaporation. Especially, Examples 1-1, 1-3, 1-4, 1-6, and 1-7 in which the weight ratio C/R was in the range of 0.2 to 1, had very good evaluation results of the rubbing resistance in recording on glossy paper and the viscosity after evaporation. Further, Examples 1-1 to 1-4, 1-6, and 1-7 in which the total blending amount of the first resin and the second resin was not more than 4% by weight, had very good evaluation results of the viscosity after evaporation. Meanwhile, Comparative Example 1-1 in which no second resin was used had a bad evaluation result of the rubbing resistance in recording on glossy paper.

Examples 2-1 to 2-7 and Comparative Examples 2-1 and 2-2

Examples 2-1 to 2-7 were examples using mutually different ABA-type triblock copolymers. Components, except for the pigment dispersion liquid 1 and the second resins b2 to b8, which were included in Water-based ink composition (TABLE 2) were mixed uniformly or homogeneously; and thus an ink solvent was obtained. Subsequently, the aqueous solution of each of the second resins b2 to b8 and the ink solvent were added to the pigment dispersion liquid 1, followed by being mixed uniformly. After that, the obtained mixture was filtrated through a cellulose acetate membrane filter (pore size 3.00 μm) produced by Toyo Roshi Kaisha, Ltd., and thus the water-based ink for ink-jet recording of each of Examples 2-1 to 2-7 and Comparative Examples 2-1 and 2-2 was obtained.

Regarding the water-based inks of Examples 2-1 to 2-7 and Comparative Examples 2-1 and 2-2, the evaluation of rubbing resistance in recording on glossy paper and the evaluation of viscosity after evaporation were performed similarly to those of Examples 1-1 to 1-7 and Comparative Example 1-1.

TABLE 2 shows the water-based ink compositions and the evaluation results for the water-based inks of Examples 2-1 to 2-7 and Comparative Examples 2-1 and 2-2. Note that TABLE 2 also shows the water-based ink composition and the evaluation result for the water-based ink of Example 1-1.

Table 2 (Following)—Legend
*1: Anionic surfactant; produced by LION SPECIALITY CHEMICALS CO., LTD. Regarding numerals in TABLE 2, those of the pigment dispersion liquid and copolymers indicate solid content amounts and that of the surfactant indicates the active ingredient.

TABLE 2

| | | | | Examples | | | | | | | |
|---|---|---|---|---|---|---|---|---|---|---|---|
| | | | | 1-1 | 2-1 | 2-2 | 2-3 | 2-4 | 2-5 | 2-6 | 2-7 |
| Water-based Ink Composition (% by weight) | Pigment dispersion liquid 1 | Pigment | C.I. pigment red 122 | 5.00 | 5.00 | 5.00 | 5.00 | 5.00 | 5.00 | 5.00 | 5.00 |
| | | First resin | Styrene-acrylic acid copolymer | 1.75 | 1.75 | 1.75 | 1.75 | 1.75 | 1.75 | 1.75 | 1.75 |
| | | Weight average molecular weight | Acid value mg KHO/g | | | | | | | | |
| | Second resin b1 | 10,000 | 130 | 1.00 | — | — | — | — | — | — | — |
| | Second resin b2 | 10,000 | 100 | — | 1.00 | — | — | — | — | — | — |
| | Second resin b3 | 10,000 | 150 | — | — | 1.00 | — | — | — | — | — |
| | Second resin b4 | 10,000 | 200 | — | — | — | — | — | 1.00 | — | — |
| | Second resin b5 | 6,500 | 130 | — | — | — | — | — | — | 1.00 | — |
| | Second resin b6 | 8,000 | 130 | — | — | — | 1.00 | — | — | — | — |
| | Second resin b7 | 15,000 | 130 | — | — | — | — | 1.00 | — | — | — |
| | Second resin b8 | 30,000 | 130 | — | — | — | — | — | — | — | 1.00 |

TABLE 2-continued

|  |  |  |  |  |  |  |  |  |  |
|---|---|---|---|---|---|---|---|---|---|
| Random copolymer | 10,000 | 130 | — | — | — | — | — | — | — | — |
| Polyethylene glycol | 8,000 |  | — | — | — | — | — | — | — | — |
| SUNNOL (trade name) NL1430 (*1) |  |  | 3.00 | 3.00 | 3.00 | 3.00 | 3.00 | 3.00 | 3.00 | 3.00 |
| Triethylene glycol-n-butyl ether |  |  | 5.00 | 5.00 | 5.00 | 5.00 | 5.00 | 5.00 | 5.00 | 5.00 |
| 85% Glycerol |  |  | 20.00 | 20.00 | 20.00 | 20.00 | 20.00 | 20.00 | 20.00 | 20.00 |
| Water |  |  | balance | balance | balance | balance | balance | balance | balance | balance |
| Second resin/First resin (C/R) |  |  | 0.571 | 0.571 | 0.571 | 0.571 | 0.571 | 0.571 | 0.571 | 0.571 |
| First resin + Second resin |  |  | 2.75 | 2.75 | 2.75 | 2.75 | 2.75 | 2.75 | 2.75 | 2.75 |
| Rubbing resistance in recording on glossy paper |  |  | AA | AA | AA | AA | AA | AA | A | AA |
| Viscosity after evaporation |  |  | AA | AA | AA | AA | AA | A | AA | A |

|  |  |  |  | Comparative Examples | |
|---|---|---|---|---|---|
|  |  |  |  | 2-1 | 2-2 |
| Water-based Ink Composition (% by weight) | Pigment dispersion liquid 1 | Pigment | C.I. pigment red 122 | 5.00 | 5.00 |
|  |  | First resin | Styrene-acrylic acid copolymer | 1.75 | 1.75 |
|  |  | Weight average molecular weight | Acid value mg KHO/g |  |  |
|  |  | Second resin b1 | 10,000 130 | — | — |
|  |  | Second resin b2 | 10,000 100 | — | — |
|  |  | Second resin b3 | 10,000 150 | — | — |
|  |  | Second resin b4 | 10,000 200 | — | — |
|  |  | Second resin b5 | 6,500 130 | — | — |
|  |  | Second resin b6 | 8,000 130 | — | — |
|  |  | Second resin b7 | 15,000 130 | — | — |
|  |  | Second resin b8 | 30,000 130 | — | — |
|  |  | Random copolymer | 10,000 130 | 1.00 | — |
|  |  | Polyethylene glycol | 8,000 | — | 1.00 |
|  |  | SUNNOL (trade name) NL1430 (*1) |  | 3.00 | 3.00 |
|  |  | Triethylene glycol-n-butyl ether |  | 5.00 | 5.00 |
|  |  | 85% Glycerol |  | 20.00 | 20.00 |
|  |  | Water |  | balance | balance |
|  |  | Second resin/First resin (C/R) |  | — | — |
|  |  | First resin + Second resin |  | 1.75 | 1.75 |
|  |  | Rubbing resistance in recording on glossy paper |  | B | B |
|  |  | Viscosity after evaporation |  | AA | AA |

As shown in TABLE 2, Examples 2-1 to 2-7 had good evaluation results of the rubbing resistance in recording on glossy paper and the viscosity after evaporation. Especially, Examples 2-1 to 2-4 in which the second resin had a weight average molecular weight of 8,000 to 15,000 and an acid value of 100 mgKOH/g to 150 mgKOH/g, had very good evaluation results of the rubbing resistance in recording on glossy paper and the viscosity after evaporation. Meanwhile, Comparative Example 2-1 in which the random copolymer was used instead of the second resin and Comparative Example 2-2 in which the polyethylene glycol was used instead of the second resin had bad evaluation results of the rubbing resistance in recording on glossy paper.

Examples 3-1 to 3-3

Examples 3-1 to 3-3 were examples using mutually different pigment dispersion liquids. Components, except for each pigment dispersion liquid and the second resin b1, which were included in Water-based ink composition (TABLE 3) were mixed uniformly or homogeneously; and thus an ink solvent was obtained. Subsequently, the aqueous solution of the second resin b1 and the ink solvent were added to each pigment dispersion liquid, followed by being mixed uniformly. After that, the obtained mixture was filtrated through a cellulose acetate membrane filter (pore size 3.00 µm) produced by Toyo Roshi Kaisha, Ltd., and thus the water-based ink for ink-jet recording of each of Examples 3-1 to 3-3 was obtained.

Regarding the water-based inks of Examples 3-1 to 3-3, the evaluation of rubbing resistance in recording on glossy paper and the evaluation of viscosity after evaporation were performed similarly to those of Examples 1-1 to 1-7 and Comparative Example 1-1.

TABLE 3 shows the water-based ink compositions and the evaluation results for the water-based inks of Examples 3-1 to 3-3. Note that TABLE 3 also shows the water-based ink composition and the evaluation result for the water-based ink of Example 1-1.

Table 3 (Following)—Legend

*1: Anionic surfactant; produced by LION SPECIALITY CHEMICALS CO., LTD.

*2: Anionic surfactant; produced by Kao Corporation
Regarding numerals in TABLE 3, those of the pigment dispersion liquids and copolymers indicate solid content amounts and that of the surfactants indicates the active ingredient.

TABLE 3

|  |  |  |  | Examples | | | |
| --- | --- | --- | --- | --- | --- | --- | --- |
|  |  |  |  | 1-1 | 3-1 | 3-2 | 3-3 |
| Water-based Ink Composition (% by weight) | Pigment dispersion liquid 1 | Pigment | C.I. pigment red 122 | 5.00 | — | — | — |
|  |  | First resin | Styrene-acrylic acid copolymer | 1.75 | — | — | — |
|  | Pigment dispersion liquid 2 | Pigment | C.I. pigment red 122 | — | 5.00 | — | — |
|  |  | First resin | Styrene-methacrylic acid copolymer | — | 2.25 | — | — |
|  | Pigment dispersion liquid 3 | Pigment | C.I. pigment yellow 74 | — | — | 5.00 | — |
|  |  | First resin | Styrene-acrylic acid copolymer | — | — | 1.00 | — |
|  | Pigment dispersion liquid 4 | Pigment | C.I. pigment blue 15:3 | — | — | — | 5.00 |
|  |  | First resin | Styrene-acrylic acid copolymer | — | — | — | 2.00 |
|  |  | Weight average molecular weight | Acid value mg KHO/g |  |  |  |  |
|  | Second resin b1 | 10,000 | 130 | 1.00 | 1.00 | 1.00 | 1.00 |
|  | SUNNOL (trade name) NL1430 (*1) | | | 3.00 | 3.00 | — | — |
|  | NEOPELEX (trade name) G-15 (*2) | | | — | — | 3.00 | 3.00 |
|  | Triethylene glycol-n-butyl ether | | | 5.00 | 5.00 | 5.00 | 5.00 |
|  | 85% Glycerol | | | 20.00 | 20.00 | 20.00 | 20.00 |
|  | Water | | | balance | balance | balance | balance |
| Second resin/First resin (C/R) | | | | 0.571 | 0.444 | 1.00 | 0.500 |
| First resin + Second resin | | | | 2.75 | 3.25 | 2.00 | 3.00 |
| Rubbing resistance in recording on glossy paper | | | | AA | AA | AA | AA |
| Viscosity after evaporation | | | | AA | AA | AA | AA |

As shown in TABLE 3, regarding Examples 3-1 to 3-3, the evaluation results of the rubbing resistance in recording on glossy paper and the viscosity after evaporation were equivalent to the evaluation results of Example 1-1.

As described above, the water-based ink of the present teaching has a good rubbing resistance in recording on glossy paper and is less likely to increase the viscosity after evaporation. The way of use of the water-based ink of the present teaching is not particularly limited, and the water-based ink is widely applicable to various types of ink-jet recording.

What is claimed is:

1. A water-based ink for ink-jet recording, comprising:
a pigment
water;
a first resin containing at least one of methacrylic acid and acrylic acid as a monomer; and
a second resin, wherein the second resin is an ABA-type triblock copolymer which has a polymer block A composed only of methyl methacrylate and methacrylic acid and a polymer block B composed only of benzyl methacrylate and methacrylic acid; which has a weight average molecular weight of 3,000 to 30,000; which has an acid value of 90 mgKOH/g to 200 mgKOH/g; and which is partially or completely neutralized.

2. The water-based ink for ink-jet recording according to claim 1, wherein a weight ratio of a blending amount of the second resin in the water-based ink to a blending amount of the first resin in the water-based ink is in a range of 0.2 to 1.

3. The water-based ink for ink-jet recording according to claim 1, wherein a total blending amount of the first resin and the second resin in the water-based ink is not more than 4% by weight.

4. The water-based ink for ink-jet recording according to claim 1, wherein the second resin has a weight average molecular weight of 8,000 to 15,000.

5. The water-based ink for ink-jet recording according to claim 1, wherein the second resin has an acid value of 100 mgKOH/g to 150 mgKOH/g.

6. The water-based ink for ink-jet recording according to claim 1, wherein a ratio of a weight average molecular weight of the polymer block A to a weight average molecular weight of the polymer block B is in a range of 0.5 to 2.

7. The water-based ink for ink-jet recording according to claim 1, wherein a weight ratio of the methyl methacrylate to the methacrylic acid in the polymer block A is in a range of 1.7 to 3.8; and
a weight ratio of the benzyl methacrylate to the methacrylic acid in the polymer block B is in a range of 3.8 to 32.0.

8. The water-based ink for ink-jet recording according to claim 1, wherein the ABA-type triblock copolymer is neutralized by potassium hydroxide.

9. The water-based ink for ink-jet recording according to claim 1, wherein a weight ratio of a total blending amount of the first resin and the second resin in the water-based ink to a blending amount of the pigment in the water-based ink is in a range of 0.26 to 1.4.

10. The water-based ink for ink-jet recording according to claim 1, wherein the first resin is a dispersant and adsorbs to the pigment to disperse the pigment in the water.

11. The water-based ink for ink-jet recording according to claim 1, wherein the first resin is one selected from the group consisting of a styrene-acrylic acid copolymer, a styrene-methacrylic acid copolymer, and salts thereof.

12. The water-based ink for ink-jet recording according to claim 1, wherein the pigment is a color pigment.

13. The water-based ink for ink-jet recording according to claim 1, wherein the pigment is a resin dispersible pigment.

14. An ink cartridge comprising the water-based ink for ink-jet recording as defined in claim 1.

15. An ink-jet recording method comprising discharging the water-based ink for ink-jet recording as defined in claim 1 on glossy paper in accordance with an ink-jet system to perform recording.

* * * * *